United States Patent [19]

Kubolis et al.

[11] 4,222,469

[45] Sep. 16, 1980

[54] INCHING CONTROL SYSTEM FOR INDUSTRIAL LIFT TRUCKS

[75] Inventors: William J. Kubolis, Mt. Ephrain, N.J.; Victor L. Chun, Holland, Pa.

[73] Assignee: Eaton Corporation, Cleveland, Ohio

[21] Appl. No.: 962,846

[22] Filed: Nov. 22, 1978

Related U.S. Application Data

[63] Continuation of Ser. No. 732,822, Oct. 15, 1976, abandoned, which is a continuation-in-part of Ser. No. 637,556, Dec. 4, 1975, abandoned.

[51] Int. Cl.³ .................. B60K 29/02; F16D 25/10
[52] U.S. Cl. ........................ 192/4 A; 192/113 R
[58] Field of Search ............ 192/4 A, 4 C, 13 R, 192/87.18, 87.19, 103 F, 109 F

[56] References Cited

U.S. PATENT DOCUMENTS

| 2,979,963 | 4/1961 | Snoy ............................. 192/87.19 |
| 2,997,144 | 8/1961 | Gsching et al. .................. 192/103 F |
| 3,613,844 | 10/1971 | Asano et al. ..................... 192/4 C |
| 3,674,121 | 7/1972 | Copeland ........................ 192/109 F |
| 3,715,017 | 2/1973 | Jenny ............................ 192/109 F |
| 3,774,736 | 11/1973 | Ito et al. ....................... 192/4 A |
| 3,938,637 | 2/1976 | Murakami ........................ 192/87.19 |
| 3,941,223 | 3/1976 | Murakami ........................ 192/4 A |
| 3,990,549 | 11/1976 | Sisson ........................... 192/4 A |
| 4,006,685 | 2/1977 | Zeller ........................... 192/109 F |

FOREIGN PATENT DOCUMENTS 1131032 10/1968 United Kingdom ................ 192/103 F

*Primary Examiner*—Peter M. Caun
*Attorney, Agent, or Firm*—R. J. McCloskey; F. M. Sajovec, Jr.

[57] ABSTRACT

A system for effecting the gradual engagement and disengagement of the clutches of a fluid power shifted transmission for industrial lift trucks. The system includes a selector valve for porting fluid from an engine driven pump to the clutches of the transmission and from the clutches to a system reservoir; the selector valve includes damping means for limiting the rate of change in flow through the valve. The system further includes a control valve which operates to limit the pump outlet pressure at engine speeds above a predetermined maximum and to decrease the pump outlet pressure and therefore the clutch actuation force in response to increases in the force applied by the truck brakes.

9 Claims, 2 Drawing Figures

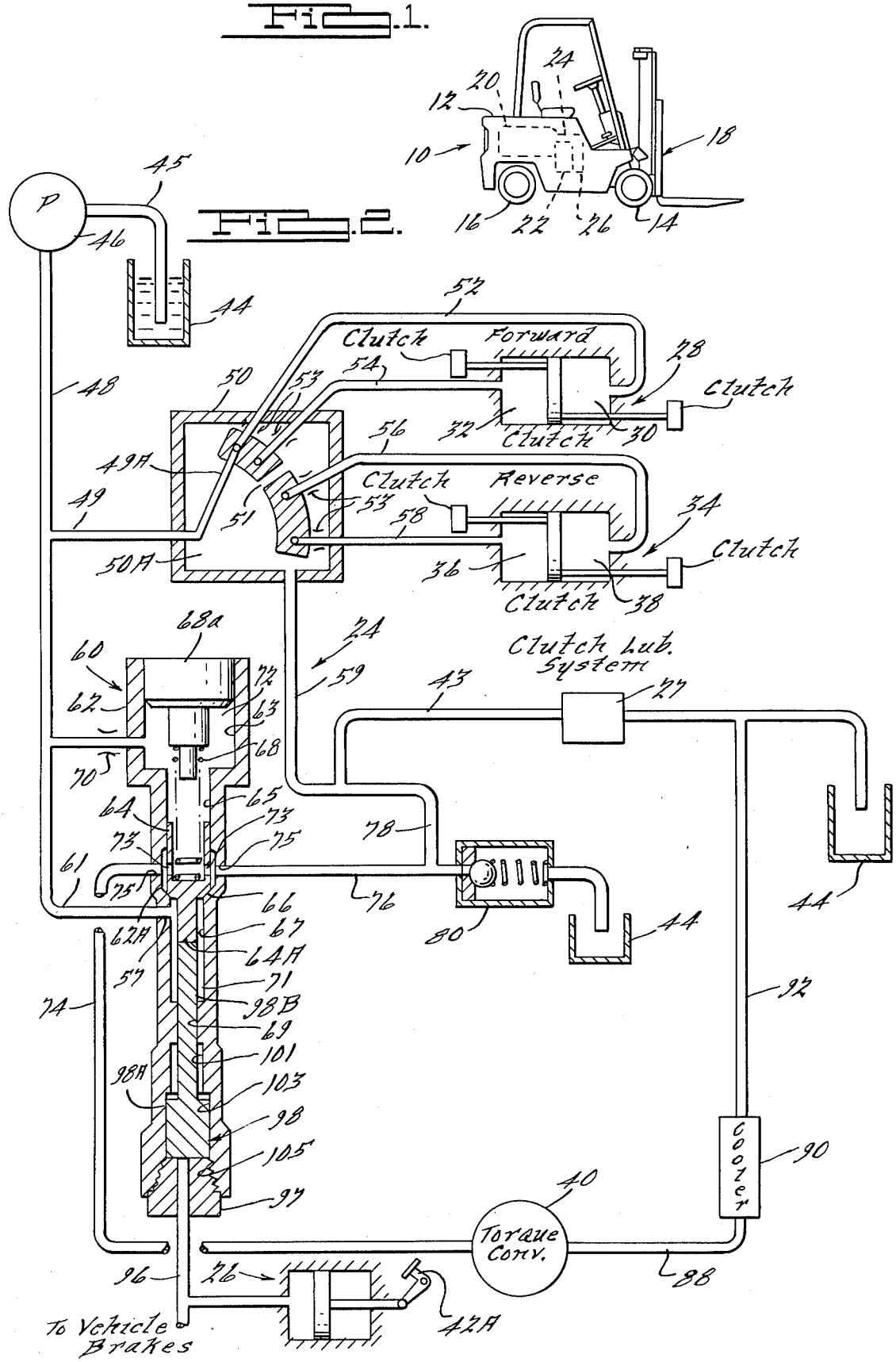

INCHING CONTROL SYSTEM FOR INDUSTRIAL LIFT TRUCKS

This is a continuation of application Ser. No. 732,822, filed Oct. 15, 1976, now abandoned, which is a continuation-in-part of Ser. No. 637,556, filed Dec. 4, 1975, now abandoned.

BACKGROUND OF THE INVENTION

1. Field of the Invention

This invention relates generally to industrial trucks and more specifically to systems for controlling the operation of fluid actuated clutches in fluid power shifted transmissions employed in such trucks.

2. Description of the Prior Art

The operation of industrial lift trucks having fluid power shifted transmissions generally requires that provision be made for "inching" the vehicle. That is, the vehicle must be capable of moving very slowly while its engine operates at a high speed. This mode of operation is commonly effected in prior art systems by use of a pressure regulating valve that reduces the pressure of the fluid supplied the actuated clutch, causing it to slip, in response to increases in brake actuation force. See, e.g., U.S. Pat. No. 3,715,017.

The prior art systems, however, have exhibited certain disadvantages. One of these arises from the fact that the pressure regulating valve has been fluidly connected in series with clutches, causing the valve to operate on that portion of the outlet flow of the pump used for clutch actuation. This is a relatively low flow which varies with clutch leakage rate. Operating on this low, fluctuating flow makes control of clutch actuation pressure difficult, often causing "starving" of a clutch as slipping is effected and subsequent flow surges when the starved clutch is reactuated. These flow phenomena result in erratic operation of the vehicle in the inching mode.

Another related disadvantage is the number and complexity of components needed in prior art systems to control the rate of pressure buildup in the clutches during changes of mode of operation, i.e., from forward to reverse or from normal to inching operation. High rates of pressure change tend to cause the vehicle to lurch. Prior art systems, of which the previously cited U.S. Pat. No. 3,715,017 is exemplary, have solved this lurching problem by additional valve components coupled to the customarily used selector and pressure regulator valves of an inching control system.

SUMMARY OF THE INVENTION

In order to overcome the disadvantages of the prior art it is an object of the present invention to provide an inching control system for industrial lift trucks wherein fluid is constantly supplied to the driving clutch in the truck's fluid power shifted transmission during the inching mode of operation.

It is another object of the present invention to provide an inching control system for industrial lift trucks wherein a minimal number of components are used to limit the rate of pressure buildup in the fluid actuated clutches of the truck's power shifted transmission.

According to one feature of the present invention a pressure regulating valve of the invention inching control system is connected to an engine driven pump in fluid parallel relationship with the fluid actuated clutches of an industrial truck transmission to effect control of the pressure supplied the clutches by operating on that relatively large part of the flow supplied by the engine driven pump which is not employed to actuate the clutches.

According to another feature of the present invention inching control system, fluid dampening means are provided in a selector valve employed to selectively port fluid from the pump to a clutch of the transmission whereby the rate of change in pressure applied to the selected clutch is limited.

BRIEF DESCRIPTION OF THE DRAWINGS

These and other objects and features will be clear to those skilled in the art of inching control systems for industrial lift trucks upon reading the following description with reference to the accompanying drawings wherein:

FIG. 1 is a side elevational view of an industrial lift truck in which the present invention is employed; and FIG. 2 is a schematic diagram of the improved inching control system.

DESCRIPTION OF THE PREFERRED EMBODIMENT

Referring now to FIG. 1, an industrial lift truck 10 is illustrated as having a vehicle body 12 supported for movement on a pair of drive wheels 14 and a pair of dirigible wheels 16. Mounted for movement with respect to the body 12 is a load engaging and moving apparatus 18. An engine or motor 20 is disposed within the body and delivers power to the drive wheels 14 by means of a fluid power shifted transmission 22. Pressurized fluid to lubricate and actuate the transmission 22 is provided by a fluid power control system 24 indicated generally in FIG. 1 and described in greater detail in the schematic of FIG. 2. The vehicle 10 is also illustrated as including a fluid actuated brake system 26.

Referring now to FIG. 2, the transmission 22 of the vehicle 10 is illustrated as including a pair of fluid actuated clutches 28 and 34 which are operative to engage the transmission 22 to drive the vehicle 10 in either forward or reverse directions, respectively. Each of the clutches 28, 34 has a pair of actuating chambers 30, 32 and 36, 38 for selecting the gear ratio to be employed in either forward or reverse operation. Transmission 22 is further illustrated as including a torque converter 40.

The brake system 26 of the truck 10 is illustrated as including a fluid piston master cylinder assembly 42. Both the brake system 26 and the transmission 22 are fluidly connected to the fluid power control system 24, which system includes a fluid reservoir 44, a fixed displacement pump 46, a selector valve 50, an inching control valve 60, a fixed restriction 70, a pressure relief valve 80, and a cooler 90.

The fixed displacement pump 46 is preferably but not necessarily drivingly mounted on the engine 20 and is supplied with fluid from the reservoir 44 through a suction line 45. Fluid from the outlet of the pump 46 is directed along a discharge conduit 48 from which a branch conduit 49 directs the fluid to the selector valve 50.

Selector valve 50 is a directional control valve operative to selectively port fluid from the conduit 49 to any of four clutch actuation conduits 52, 54, 56, and 58, communicating in consecutive pairs with the first and second actuating chambers 30, 32 and 36, 38 of the forward and reverse clutches 28 and 34 of the transmission 22. The selector valve 50 further communicates fluid from all of the conduits not selected to a return conduit 59 which is connected to a clutch lubrication conduit 43, which is connected to a known clutch lubrication system and then to the reservoir 44, and to reservoir 44 through the relief valve 80.

Also connected to the discharge conduit 48 in parallel fluid relationship with the conduit 49 is an inching control supply conduit 61 through which fluid is ported to the inching control valve 60. Upstream of this connection in parallel fluid relationship is a fixed restriction 70 through which fluid also passes to the inching control valve 60, which is fluidly connected by a discharge conduit 76 to the relief valve 80 and by a discharge conduit 74 to the torque converter 40 of the transmission 22. Fluid is discharged from the torque converter 40 through a transmission return conduit 88 which is fluidly connected to the cooler 90, which discharges through a cooler return conduit 92 to the reservoir 44.

The inching control valve 60 is illustrated as including a body 62 having formed therethrough a series of axially aligned stepped bores comprising an enlarged, partially threaded bore 63, a valve bore 65 including a conical seat portion 66, a reduced diameter bore 67, a brake piston sealing bore 69, a brake piston drain bore 101, a brake piston bore 103, and a threaded bore 105. A valve spool member 64 is slidingly received in the valve bore 65 and is biased against the seat portion 66 by the urging of a spring 68 which is mechanically grounded to the body 62 through a threaded plug 68a or similar mechanical means. A stepped down portion 64A of the valve member 64 extends into a chamber 71 defined by the bore 67. Ports 73 are formed through the spool member 64 to provide fluid communication between the chamber 72 formed by the bore 63, which is fluidly connected to the restriction 70, and the conduits 74 and 76. An annular axially extending undercut 62A is formed in the body 62 adjacent the ports 73.

A stepped piston 98, which includes an enlarged end portion 98A and a stepped down portion 98B is slidingly received in the body 62, the enlarged end portion received in the piston bore 103 and the stepped down portion 98B received in the sealing bore 69 and extending into the chamber 71. A threaded fluid connector 97 is engaged in the bore 105 to retain the piston 98 and provide communication between the chamber defined by the bore 103 and a conduit 96 fluidly connected to the piston master cylinder assembly 42 of fluid actuated brake system 26.

To prevent mixing of fluids from the brake system 26 and the fluid power control system 24 the chamber defined by the bore 101 in which leakage along bores 69 and 103 is collected, is drained to atmosphere. The chamber 71 is in continuous fluid communication with the inching control supply conduit 61 through an inlet port 57. The valve member 64 is moveable to a position wherein the inching control supply conduit 61 is in fluid communication with the inching control discharge conduits 74 and 76 through discharge ports 75 formed in the body 62.

The inching control discharge conduit 74 is fluidly connected to the torque converter 40, and the inching control discharge conduit 76 is fluidly connected to the relief valve 80. A branch return conduit 78 fluidly communicates the inching control discharge conduit 76 with clutch lubrication conduit 43 which directs the fluid to lubricate and cool the clutches. Valve 80 relieves to reservoir 44.

OPERATION OF THE PREFERRED EMBODIMENT

Either of two gear ratios may be selected for driving the industrial lift truck 10 in both forward or reverse directions. This selection is effected by the cooperation of the selector valve 50 and the fluid actuated clutches 28 and 34. Selector valve 50 is moveable from a neutral position in which the branch conduit 49 is placed in communication with a recirculating port 51 fluidly connected to an internal chamber 50A of valve 50 which is in turn connected to the return conduit 59 to four operative positions. In one operative position, that shown in FIG. 2, the branch conduit 49 is placed in fluid communication through a moveable passage 49A with clutch actuation conduit 52 through which fluid is directed to the first actuating chamber 30 of the forward clutch 28. All other clutch actuation chambers are communicated to the chamber 50A, conduit 59, and the clutch lubrication system through conduit 43. In this mode of operation a low forward speed gear ratio is selected for the industrial lift truck 10.

In another operative position the branch conduit 49 is placed in fluid communication with the clutch actuation conduit 54 through which fluid is directed to second clutch actuation chamber 32 of the forward clutch 30. The remaining actuation chambers are connected to the clutch lubrication system through chamber 50A, conduit 59 and conduit 43, as previously described. In this mode of operation, a high speed gear ratio is selected in the forward direction for the lift truck 10.

In another operative position, shown in phantom in FIG. 2, the branch conduit 49 is placed in fluid communication with clutch actuation conduit 56 through which fluid is directed to the second actuation chamber 38 of the reverse clutch 34, the remaining actuation chambers being communicated with the clutch lubrication system through chamber 50A, conduit 59, and conduit 43. In this mode of operation, a high speed reverse operation of the industrial lift truck 10 is selected.

In the final operative position of selector valve 50, the branch conduit 49 is placed in fluid communication with clutch actuation conduit 58 through which fluid is ported to the first actuation chamber 36 of the reverse clutch 34 while the remaining actuation chambers are communicated with the clutch lubrication system through chamber 50A, conduit 59, and conduit 43. In this mode of operation a low speed reverse operation of the industrial lift truck 10 is selected.

Smooth operation during transient modes of operation occurring when the above selections are made is effected by incorporating damping orifices 53 in the selector valve 50 between the branch conduit 49 and the clutch actuation conduits 52, 54, 56, and 58. It should be appreciated that while a plurality of orifices are indicated schematically in FIG. 2, it would be possible to construct a directional control valve in which all fluid passing between the branch conduit and the clutch actuation conduits would pass through a single damping orifice. In either event, the size of the orifice is chosen to limit clutch chamber fill rate. Except during the above mentioned transient modes of operation, the clutch actuation pressure is determined by the outlet pressure of pump 46 in discharge conduit 48. At low engine speeds (typically below 1100 rpm) this pressure is set, neglecting line drops, by the pressure drop across fixed orifice 70 and back pressure of torque converter 40 and cooler 90, and thus varies with the speed of the engine 20. During this low speed operation, fluid at outlet pressure is ported to the inching control valve 60 through the inching control supply conduit 61 at the annular chamber 71. A force is thus created tending to move the valve member 64 against the spring 68 and the reduced pressure in the chamber 72. At speeds above 1100 rpm, the pressure in the annular chamber 71 increases sufficiently to move valve member 64 to a position in which communication is provided between the inching control supply conduit 61 and the inching control discharge conduits 74 and 76. The valve member 64 then operates to maintain a relatively constant differential between the pump outlet pressure and the pressure in the return conduits during operation at higher speeds. The absolute value of the pressure in the return line conduits is limited by operation of the relief valve 80.

It can be seen then, that during operation of the industrial lift truck 10 at low speeds, substantially all of the fluid supplied by the pump 46 is directed to the chamber 72 through fixed restriction 70. A portion of the fluid is then directed to lubricate the clutches through conduit 76 and 43. The remainder is directed to the torque converter 40, cooler 90 and returned to reservoir 44. At speeds in excess of 1100 rpm a portion of the fluid bypasses the fixed restriction 70 through the inching control valve 60. In either case a relatively small portion of the fluid supplied by the pump 46 (from zero flow to approximately 20% of the pump's outlet flow at maximum engine speed) is utilized to actuate the forward or reverse clutches 28, 24 respectively. This clutch actuation fluid is supplied at the pressure determined by pressure drop across the fixed orifice 70 and the system back pressure or the operation of the inching control valve 60 for low and high engine speed operation, respectively.

It is during the high engine speed mode of operation that the inching mode of operation is normally effected by the cooperation of the fluid actuated brake system 26 and the inching control valve 60. During this mode of operation it is, of course, necessary for the engine to be operating at or near maximum speed to make full power available to the load engaging and moving apparatus 18; but it is desired to operate the industrial lift truck 10 at a speed lower than that which would result from the full engagement of the transmission 22. In a transmission such as the fluid power shifted transmission 22 of the present invention this speed reduction is effected by reducing the actuation force of the fluid actuated clutches 28, 34 to the point where slipping will occur. As was discussed before, in the prior art devices this reduction in force was effected by throttling inlet pressure to clutch actuation chambers. It can be appreciated from the foregoing description of the fluid control system 24, which is typical in this respect, that this necessitates throttling of relatively small amounts of flow, approaching zero flow as slipping impends. If zero flow is in fact achieved, the result is "starving" of the clutch actuation chamber and an uncontrollable fluid system resulting in erratic jerky operation of the transmission. It will be seen below that applicant's inching control system eliminates this potential problem by operating on that relatively large portion of the outlet flow pump 46 which is delivered to the transmission 22 and the clutch lubrication system.

When inching operation is desired, the vehicle is slowed by use of the fluid actuated brake system 26. When the brake actuation force exerted by actuation of a pedal 42A exceeds a predetermined value, the pressure in the brake piston and cylinder assembly 42, which is communicated to the piston 98 of the control valve 60 through the fluid connector 97, is sufficient to move the piston 98, which abuts the valve member 64, against the force of the spring 68 and the pressure in the chamber 72. This increases the area of the passage providing communication between the chamber 71 and inching control discharge conduits 74 and 76 which remain in communication with the chamber 72. The outlet pressure of the pump 46 in its discharge conduit 48 is thereby decreased as brake actuation force increases. The brake actuation force at which pump outlet pressure begins to decrease is determined by the force balance on the valve member 64; and the relationship between increases in the brake actuation force and decreases in the pump outlet pressure, that is the gain of the inching control valve 60, is determined by the choice of the rate of the spring 68 in the area-length relationships chosen for the valve member 64 and the discharge ports 75.

It will be appreciated that during high speed engine operation, particularly during the presence of high brake actuation force pump outlet flow available to the torque converter 40 may be considerably higher than required. It is for this reason that the inching control discharge conduit 76 is provided as an alternate path for the fluid. Further significance may be seen, then, in the provision of the overboard relief valve 80 directly communicating with the inching discharge conduit 76. Incorporation of this valve prevents the increase in return line pressure brought on by high bypass flows during high speed engine operation which might create erratic differential pressures across the selected clutch during these modes of operation.

While the invention inching control system has been described in one embodiment, it will be clear to those skilled in the hydraulic arts that other embodiments can be made without departing from the spirit of the present invention.

What is claimed is:

1. In a vehicle having brakes, an engine, a transmission having fluid actuated clutch means having first and second actuating chamber means, and an inching control system having a reservoir, a pump fluidly connected to the reservoir and driven at engine speed, selector valve means fluidly connected to the outlet of the pump and operative to selectively port fluid therefrom to one of said actuating chamber means, and control valve means fluidly connected to the pump for decreasing the pressure applied to the selected actuating chamber means in response to increases in brake actuation forces, an improvement wherein:

A. a restriction is fluidly connected in series between said pump and a portion of said transmission whereby the outlet pressure of said pump is caused to vary in response to changes in the speed of said engine;

B. said selector valve means, said control valve means, and said restriction are fluidly connected to the outlet of said pump through a pump outlet conduit in parallel fluid relationship with one another, and C. said control valve means is operative to sense brake actuation force and to decrease the outlet pressure of said pump in response to an increase in said actuation force above a predetermined value.

2. The improvement as defined in claim 1 wherein said control valve means is further operative, when said brake actuation force is less than said predetermined value, to substantially maintain the outlet pressure of said pump at a predetermined magnitude in response to an increase in the speed of said engine above a predetermined speed.

3. The improvement as defined in claim 1 wherein said control valve means is operative to cause an increasing portion of the outlet flow of said pump to bypass said restriction in response to said increases in brake actuation force.

4. The improvement as defined in claim 3 and including inching control discharge conduit means for directing said bypass flow portion in parallel flow relationship to said reservoir and to said transmission portion and means for limiting the pressure of said bypass flow portion.

5. The improvement as defined in claim 1 wherein said brakes are fluidly actuated and said control valve means includes inlet port means fluidly communicating with the outlet of said pump, discharge port means fluidly communicating with said transmission portion and said reservoir, and a valve member normally biased to a closed position wherein fluid communication between said inlet port means and said discharge port means is prevented and moveable therefrom to positions wherein said fluid communication is permitted, and said control valve means further includes piston means for sensing the actuation pressure of said brakes, said piston means being mechanically connected to said valve member to move said valve member from said closed position in response to increases in said actuation pressure above a predetermined value.

6. In a vehicle having brakes, an engine, a transmission having fluid actuated clutch means, having first and second actuating chamber means, and an inching control system having a reservoir, a pump fluidly connected to the reservoir and driven at engine speed, selector value means fluidly connected to the outlet of the pump and operative to selectively port fluid therefrom to one of said actuating chamber means, and control valve means fluidly connected to the pump for decreasing the pressure applied to the selected actuating chamber means in response to increases in brake actuation forces, an improvement wherein:
A. a restriction is fluidly connected in series between said pump and a portion of said transmission whereby the outlet pressure of said pump is caused to vary in response to changes in the speed of said engine;
B. said selector valve means, said control valve means, and said restriction are fluidly connected to the outlet of said pump through a pump outlet conduit in parallel fluid relationship with one another, and
C. said control valve means is operative to sense the pressure in said outlet conduit upstream of said restriction and, upon sensing a given pressure representative of a predetermined engine speed, to substantially maintain said given pressure.

7. In a vehicle having brakes, an engine, a transmission having fluid actuated clutch means having first and second actuating chamber means, and an inching control system having a reservoir, a pump fluidly connected to the reservoir and driven at engine speed, selector valve means fluidly connected to the outlet of the pump and operative to selectively port fluid therefrom to one of said actuating chamber means, and control valve means fluidly connected to the pump for decreasing the pressure applied to the selected actuating chamber means in response to increases in brake actuation forces, an improvement wherein;
A. a restriction is fluidly connected in series between said pump and a portion of said transmission whereby the outlet pressure of said pump is caused to vary in response to changes in the speed of said engine;
B. said selector valve means, said control valve means, and said restriction are fluidly connected to the outlet of said pump through a pump outlet conduit in parallel fluid relationship with one another, and
C. said control valve comprises:
  (1) inlet port means fluidly connected to the outlet of said pump;
  (2) outlet port means fluidly connected to means communicating with said reservoir;
  (3) valve means normally biased to a closed position wherein fluid communication between said ports is prevented;
  (4) means for sensing the outlet pressure of said pump and for moving said valve means to an open position wherein fluid communication between said ports is permitted upon sensing an increase in said pressure to a predetermined magnitude corresponding to a given engine speed, thereby substantially maintaining said outlet pressure at said predetermined magnitude; and
  (5) means for sensing the actuation force of said brakes and for moving said valve means from said closed position in response to an increase in said actuation force above a predetermined magnitude to thereby decrease the outlet pressure of said pump.

8. The improvement as defined in claim 7 wherein said communicating means comprises:
A. a first conduit whereby fluid is directed to said transmission portion downstream from said restriction;
B. a second conduit arranged fluidly in parallel with said first conduit whereby fluid is directed to said reservoir; and
C. means for limiting the pressure in said first and second conduits.

9. The improvement as defined in claim 7 wherein said brakes are fluidly actuated and include fluid cylinder means containing fluid at a pressure proportional to said brake actuation force and wherein said brake sensing and moving means comprises piston means fluidly connected to said fluid cylinder means at one end and abutting said valve means at the other end.

* * * * *